(No Model.)
G. F. SIMONDS.
BALL BEARING.
No. 449,954.  Patented Apr. 7, 1891.
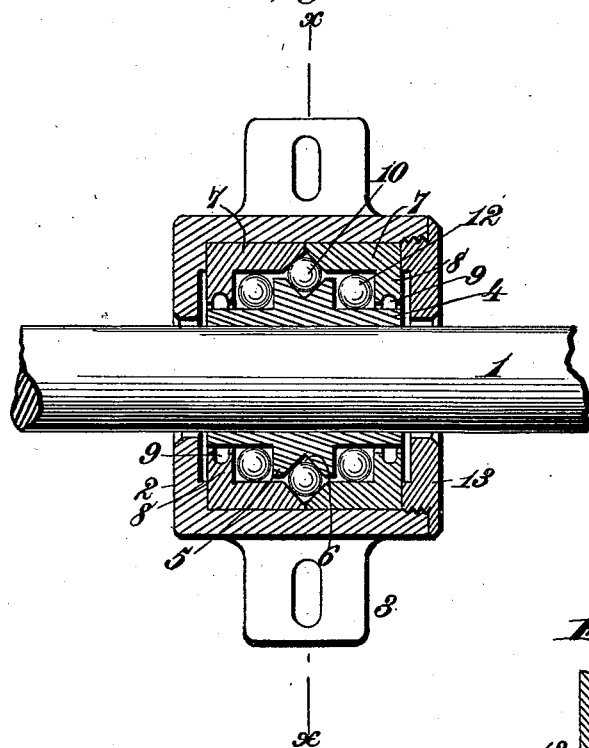
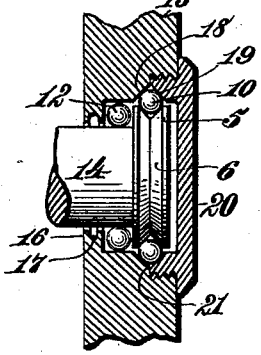
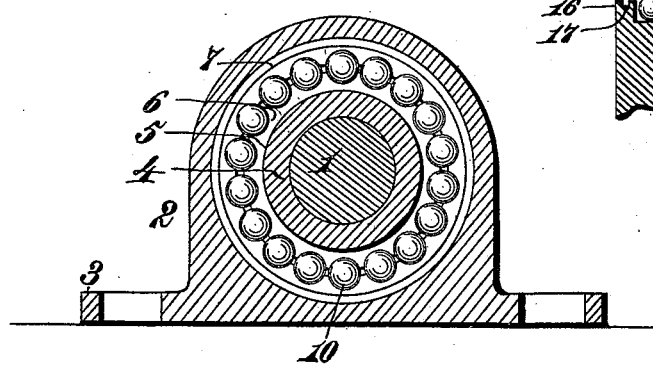
Witnesses.
Robert Barrett
J. A. Rutherford
Inventor:
George F. Simonds.
By James L. Norris.
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 449,954, dated April 7, 1891.

Application filed August 2, 1890. Serial No. 360,806. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

In ball-bearings heretofore invented by me, and described and shown in my several Letters Patent bearing date August 19, 1890, I employ annular sets of spherical rollers or balls for sustaining or supporting the radial pressure, and other annular sets of spherical rollers or balls arranged at opposite sides of a rib or collar formed with a tubular piece or sleeve or other bearing-surface for resisting or counteracting the endwise thrusts of a shaft or journal or axle.

The object of my present invention is to provide a novel construction whereby an annular set or sets of spherical rollers or balls sustain or support the radial pressure or weight, and a single set of annular spherical rollers or balls fulfills the conditions required for resisting or counteracting endwise thrusts of a shaft or journal or axle in contradistinction to two independent annular sets of rollers or balls, as in my several Letters Patent alluded to. To accomplish this object my invention involves the features of construction, the combination or arrangement of devices, and the principles of operation hereinafter described and claimed, reference being made to the accompanying drawings, in which—

Figure 1 is a sectional view of a journal-box having a rotating shaft provided with my improved ball-bearing. Fig. 2 is a sectional view taken on the line $x\,x$, Fig. 1. Fig. 3 is a detail sectional view showing a modification of the improvement.

In order to enable those skilled in the art to make and use my invention, I will now describe the same in detail, referring to the drawings, where—

The numeral 1, Figs. 1 and 2, indicates a revolving shaft, or journal, or axle, and 2 a box of any suitable construction, adapted to be secured in a fixed position to a suitable support by lateral flanges 3 or other appropriate devices. The shaft, or journal, or axle, is provided with a tubular piece or sleeve 4, having an annular projecting rib or collar 5 intermediate its ends, which is formed in the outer periphery with a circular groove 6, the walls of which converge to the bottom of the groove in such manner that the latter is V-shaped, or approximately so, in cross-section. In the box are arranged two independent rings or annular pieces 7, having their adjacent or contiguous edges beveled, so that when the parts are properly assembled in the box the beveled edges constitute a circular groove of a shape corresponding to the form of the groove in the rib or collar on the tubular piece or sleeve. The outer end portion of each ring or annular piece 7 is formed with a flange 8, containing an annular packing-groove 9, to contain a packing of any material suitable for the conditions required, such packing bearing against the ends of the tubular piece or sleeve 4 to provide a tight joint between the parts, and thereby effectually exclude all dust, dirt, and other foreign matter from the ball-bearing.

In the circular groove of the rib or collar 4 and the rings or annular pieces 7 is arranged a single annular set of spherical rollers or balls 10, and at each side of the rib or collar 5 is arranged an annular set of spherical rollers or balls 12, which have a pressure-supporting contact with the internal surfaces of the rings or annular pieces and the external surface of the tubular piece or sleeve 4, the construction being such that the annular sets of spherical rollers or balls 12 sustain or support the radial pressure or weight which arises in the practical use of the ball-bearing.

The circular groove in the rib or collar and in the rings or annular pieces are so relatively constructed that the spherical rollers or balls 10 do not sustain or support radial pressure or weight, but merely bear against the walls of the grooves to resist or counteract the endwise thrusts of the shaft or journal or axle in either direction.

The ball-bearing, comprising the tubular piece or sleeve 4, the rings or annular pieces 7, and the spherical rollers or balls, is confined within the box 2 by means of a screw-cap 13, which is screwed into the box, as shown in Fig. 1, and bears against the rings or annular pieces 7 for the purpose of properly retaining the latter in correct position, in consequence of which the entire ball-bearing is preserved in correct working position and accidental disengagement of the parts is effectually prevented.

In the modification Fig. 3 I illustrate my invention in a construction where a single annular set of spherical rollers or balls 12 sustain or support the radial pressure or weight, while a single annular set of spherical rollers or balls 10 resist or counteract the endwise thrusts of the axle or journal 14 in either direction.

In Fig. 3 the axle or journal 14 constitutes a bearing-surface, as does the tubular piece or sleeve 4, exhibited in Figs. 1 and 2, and this bearing-surface 14 in Fig. 3 is provided with an annular collar 5, the same as the tubular piece or sleeve 4 in Fig. 1. The periphery of the collar 5 is formed with a circular groove 6, the walls of which converge toward the bottom of the groove. The annular set of spherical rollers or balls 12 rest upon the bearing-surface or axle 14 and against the internal surface of the part 15, which part may be the hub of a wheel or other device. The hub is provided with a flange 16, containing an annular packing-groove 17, for the purpose of receiving a suitable packing to make a tight joint between the wheel-hub and the axle for excluding dust, dirt, and other foreign matter. The wheel-hub is provided with a chamber having a beveled wall 18, which, in conjunction with the beveled wall 19 of a screw-cap 20, forms or constitutes an annular groove 21, the walls of which converge toward the bottom of the groove in such manner that the annular set of spherical rollers or balls 10 are seated or confined in such groove. The construction of the parts is such that the annular set of spherical rollers or balls 10 does not have a pressure-supporting contact with the wheel-hub, but merely such lateral contact as will resist or counteract the endwise thrusts of the axle or journal in either direction; but the annular set of spherical rollers or balls 12 have a pressure-supporting contact with the wheel-hub, and consequently they fulfill the conditions required for sustaining or supporting the radial pressure or weight.

In each of the constructions illustrated the annular set of spherical rollers or balls 12 have no pressure-supporting contact with the annular rib or collar 5 and the flange which contains the packing, in consequence of which such annular set of spherical rollers or balls does not operate to resist or counteract endwise thrusts of the axle or journal. By the present invention an annular set or sets of spherical rollers or balls operate to sustain or support the radial pressure or weight, while a single annular set of spherical rollers or balls serves to resist or counteract endwise thrusts of a shaft or journal or axle in either direction, and by this means a more economical ball-bearing is provided.

It will be observed that the bearing-surface 4 or 14 is concentric with a bearing-surface on the ring or rings 7 or the part 15, and, further, that the rib or collar 5 is formed with a plane surface—one or more—parallel with a plane surface on the flange of the ring or rings 7 or the part 15. By this construction the concentric surfaces are at right angles to the parallel plane surfaces and the spherical rollers or balls bear and roll upon the concentric surfaces at diametrically-opposite points, while the parallel plane surfaces merely retain the spherical rollers or balls in place.

Having thus described my invention, what I claim is—

1. A ball-bearing comprising a bearing-surface provided with an annular rib or collar having a circular groove the walls of which converge toward the bottom thereof, an annular set or sets of spherical rollers or balls operating to resist or support radial pressure or weight, and a single annular set of spherical rollers or balls engaging the circular groove in the rib or collar and serving to counteract the endwise thrusts of a shaft or journal or axle in either direction, substantially as described.

2. A ball-bearing comprising a tubular piece or sleeve having an annular rib or collar provided with a circular groove, the rings or annular pieces having beveled edges to form a circular groove, the annular sets of spherical rollers or balls arranged at opposite sides of the rib or collar to sustain or support radial pressure or weight, and a single annular set of spherical rollers or balls arranged in said annular grooves to resist or counteract endwise thrusts of a shaft or journal or axle, substantially as described.

In testimony whereof I have affixed my signature in presence of two witnesses.

GEO. F. SIMONDS.

Witnesses:
JAMES A. RUTHERFORD,
ALBERT H. NORRIS.